(12) United States Patent
Gomita

(10) Patent No.: US 12,028,619 B2
(45) Date of Patent: Jul. 2, 2024

(54) IMAGE PROCESSING DEVICE AND IMAGE PROCESSING METHOD

(71) Applicant: SONY GROUP CORPORATION, Tokyo (JP)

(72) Inventor: Jun Gomita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/905,042

(22) PCT Filed: Feb. 26, 2021

(86) PCT No.: PCT/JP2021/007531
§ 371 (c)(1),
(2) Date: Aug. 25, 2022

(87) PCT Pub. No.: WO2021/177187
PCT Pub. Date: Sep. 10, 2021

(65) Prior Publication Data
US 2023/0096626 A1 Mar. 30, 2023

(30) Foreign Application Priority Data
Mar. 5, 2020 (JP) .................................. 2020-038258

(51) Int. Cl.
*H04N 23/73* (2023.01)
*G06T 7/70* (2017.01)
(Continued)

(52) U.S. Cl.
CPC ............... *H04N 23/73* (2023.01); *G06T 7/70* (2017.01); *G06V 10/60* (2022.01); *G06V 10/761* (2022.01);
(Continued)

(58) Field of Classification Search
CPC .......... H04N 23/73; H04N 2013/0081; H04N 23/741; H04N 23/743; G06T 7/70;
(Continued)

(56) References Cited

U.S. PATENT DOCUMENTS

| | | | |
|---|---|---|---|
| 2018/0174323 A1* | 6/2018 | Ji | ............................... G06T 7/74 |
| 2020/0154023 A1* | 5/2020 | Sato | ....................... B64C 39/024 |
| 2021/0195092 A1* | 6/2021 | Huang | .................. H04N 23/741 |

FOREIGN PATENT DOCUMENTS

| | | | |
|---|---|---|---|
| JP | 2016-045874 A | 4/2016 |
| JP | 2017-118551 A | 6/2017 |

(Continued)

OTHER PUBLICATIONS

International Search Report and Written Opinion of PCT Application No. PCT/JP2021/007531, dated May 11, 2021, 08 pages of ISRWO.

*Primary Examiner* — Jason A Flohre
(74) *Attorney, Agent, or Firm* — CHIP LAW GROUP

(57) ABSTRACT

An image processing device (1) includes an exposure control unit (102), a Δ pose estimating unit (109), and an integration unit (111). The exposure control unit (102) controls exposure by sequentially performing positive correction of increasing exposure from proper exposure or negative correction of decreasing exposure from the proper exposure as the exposure at a time of acquiring each of a plurality of image frames in time series in a predetermined execution order. The Δ pose estimating unit (109) estimates first position pose of the image processing device based on matching between image frames subjected to the positive correction and second position pose of the image processing device based on matching between image frames subjected to the negative correction. The integration unit (111) integrates the first position pose and the second position pose.

9 Claims, 8 Drawing Sheets

(51) Int. Cl.
  *G06V 10/60* (2022.01)
  *G06V 10/74* (2022.01)
(52) U.S. Cl.
  CPC ............... *G06T 2207/10144* (2013.01); *G06T 2207/20024* (2013.01)
(58) Field of Classification Search
  CPC ........... G06T 2207/10144; G06T 2207/20024; G06V 10/60; G06V 10/761; G06V 10/14; G03B 7/091; G05D 1/02
  See application file for complete search history.

(56) References Cited

FOREIGN PATENT DOCUMENTS

| | | | |
|---|---|---|---|
| JP | 2018-112936 | A | 7/2018 |
| JP | 2019-047436 | A | 3/2019 |
| JP | 2020-017173 | A | 1/2020 |

\* cited by examiner

IMAGE PROCESSING DEVICE AND IMAGE PROCESSING METHOD

CROSS REFERENCE TO RELATED APPLICATIONS

This application is a U.S. National Phase of International Patent Application No. PCT/JP2021/007531 filed on Feb. 26, 2021, which claims priority benefit of Japanese Patent Application No. JP 2020-038258 filed in the Japan Patent Office on Mar. 5, 2020. Each of the above-referenced applications is hereby incorporated herein by reference in its entirety.

FIELD

The present disclosure relates to an image processing device and an image processing method.

BACKGROUND

There is known technology called simultaneous localization and mapping (SLAM) for simultaneously performing self-localization and environmental mapping. SLAM enables obtaining the self-position from a state in which there is no prior information such as map information and thus greatly contributes to implementation of autonomous traveling under an unknown environment of automobiles, robots, unmanned aerial vehicles (UAV), or the like.

Furthermore, among SLAM, technology for performing self-localization and map construction by extracting feature points from a captured image such as a camera image and tracking the extracted feature points in time series is referred to as "Visual SLAM".

CITATION LIST

Patent Literatures

Patent Literature 1: JP 2016-045874 A
Patent Literature 2: JP 2018-112936 A
Patent Literature 3: JP 2017-118551 A

SUMMARY

Technical Problem

A self-position estimated by "Visual SLAM" or the like is geometrically derived on the basis of a captured image such as a camera image. Therefore, whether or not the self-localization succeeds and the accuracy thereof depend on the content of the captured image.

Therefore, the present disclosure proposes an image processing device and an image processing method capable of improving the accuracy of the self-localization without being affected by the content of a captured camera image.

Solution to Problem

In order to solve the above problems, an image processing device according to the present disclosure includes an exposure control unit, a Δ pose estimating unit, and an integration unit. The exposure control unit controls exposure by sequentially performing positive correction of increasing exposure from proper exposure or negative correction of decreasing exposure from the proper exposure as the exposure at a time of acquiring each of a plurality of image frames in time series in a predetermined execution order. The Δ pose estimating unit estimates first position pose of the image processing device based on matching between image frames subjected to the positive correction and second position pose of the image processing device based on matching between image frames subjected to the negative correction. The integration unit integrates the first position pose and the second position pose.

DESCRIPTION OF EMBODIMENTS

Figure 1:
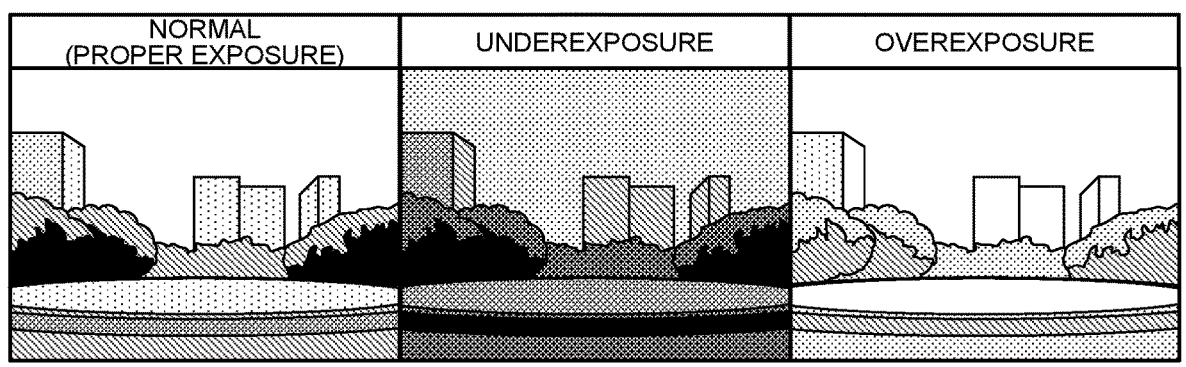
FIG. 1 is a diagram illustrating comparative examples of camera images with different exposures.

Hereinafter, embodiments of the present disclosure will be described in detail on the basis of the drawings. Note that, in the following embodiments, there are cases where redundant description is omitted by denoting the same parts by the same symbol.

Note that, in the present specification and the drawings, a plurality of components having substantially the same functional configuration may be distinguished by attaching different numerals after the same symbol. For example, multiple components having substantially the same functional configuration are distinguished as in a camera 101a and a camera 101b, as necessary. However, in a case where it is not particularly necessary to distinguish each of a plurality of components having substantially the same functional configuration, only the same symbol is attached. For example, in a case where it is not necessary to particularly distinguish between the camera 101a and the camera 101b, they are simply referred to as imaging units 101.

In addition, the present disclosure will be described in the following order of items.

1. Introduction
2. Functional Configuration Example
2-1. Operation Example (1) of Image Processing Device
2-2. Operation Example (2) of Image Processing Device
3. Processing Procedure Example
4. Modifications
4-1. Modification Regarding Device Configuration
4-2. Modification Regarding Processing Procedure
4-3. Others
5. Conclusion

1. Introduction

Conventionally, in "Visual SLAM" or the like, a result of self-localization is geometrically derived on the basis of information of a scene captured in a camera image. Therefore, whether or not the self-localization succeeds and the accuracy thereof are affected by how much useful information is captured in the image and how much resolution is obtained (whether a geometric error is small).

For example, in "Visual SLAM" or the like, characteristic points (feature points) that can be used for self-localization are detected from a camera image. A feature point typically corresponds to a region in an image having high contrast and having no structure similar to that of the surroundings.

A camera image has a finite dynamic range, and in a case where imaging is performed in an environment with high contrast, blown-out highlights occur in bright spots and blocked-up shadows occur in dark spots. The environment with high contrast corresponds to, for example, the outdoors in good weather, the indoors using strong illumination light such as an operating room or a stage and cases of viewing the outdoors from the indoors such as a tunnel. It is difficult to extract a feature point from a camera image in which blown-out highlights or blocked-up shadows have occurred, which is an obstacle for successful self-localization and the accuracy thereof. If no feature point can be extracted from a camera image, self-localization fails.

In the operation of "Visual SLAM" or the like, the brightness of the imaging environment can greatly change depending on various conditions such as a place, time, and the weather. In order to stably implement the self-localization in an environment with any brightness, it is necessary to maintain the camera image at an appropriate luminance level (avoid blown-out highlights and blocked-up shadows). Therefore, when a camera image is acquired, the exposure of the camera is controlled on the basis of the luminance level of the camera image in order to maintain the luminance of the camera image at an appropriate level.

However, even if exposure control of the camera is performed, there are cases where it is not possible to avoid blown-out highlights or blocked-up shadows in an environment with high contrast. In a case where each pixel of the camera image is expressed by an 8-bit digital signal, the expressible contrast ratio is 255 times, but in an environment with higher contrast, regions with blown-out highlights or blocked-up shadows may occur. FIG. 1 is a diagram illustrating comparative examples of camera images with different exposures.

As illustrated in FIG. 1, the diagram illustrated on the left side of FIG. 1 is an example of a camera image captured, for example, with an exposure amount (hereinafter referred to as "proper exposure") adjusted in a manner so that the luminance level of the camera image is appropriate. The diagram illustrated in the center of FIG. 1 is an example of a camera image captured with an exposure amount ("underexposure") adjusted so that the luminance level of the camera image is lower than appropriate luminance. The diagram illustrated on the right side of FIG. 1 is an example of a camera image captured with an exposure amount ("overexposure") adjusted so that the luminance of the camera image is higher than appropriate luminance level.

As in the camera image illustrated in the left diagram of FIG. 1, even in a case where the exposure is adjusted to the proper exposure, blown-out highlights occur in a bright region such as the sky, whereas blocked-up shadows occur in a dark region such as the shade of trees. That is, the image is a typical camera image having an insufficient dynamic range.

On the other hand, in the camera image illustrated in the center of FIG. 1, it is possible to prevent occurrence of a blown-out highlight region by adjusting the exposure to underexposure, but it is not possible to prevent occurrence of a blocked-up shadow region. Furthermore, in the camera image illustrated in the right diagram of FIG. 1, it is possible to prevent occurrence of a blocked-up shadow region by adjusting the exposure to overexposure, but it is not possible to prevent occurrence a blown-out highlight region. As described above, due to the limit of the dynamic range of the camera, in a camera image captured in an environment with high contrast, there are cases where it is impossible to prevent occurrence of both the blown-out highlight region and the blocked-up shadow region even if the exposure adjustment is performed.

As a method of solving the problem that the dynamic range of the camera is insufficient as described above, there is a method of taking a plurality of images with different exposures and combining the images. That is, this technology is a method of obtaining an image without blown-out highlights nor blocked-up shadows by photographing a plurality of images having different exposures such as "underexposure" or "overexposure", that is, photographing a plurality of images having different dynamic ranges and combining the images. This technology has no problem in a case where the camera or a subject does not change its position between the plurality of images, however in other cases, there is a problem that an item of which position has been changed appears to be shifted and overlapped. Although measures such as estimating the movement and performing alignment are conceivable, it is difficult to perform perfect alignment, and an error in the alignment appears in the composite image as an artifact such as a false edge.

In addition, as another method for solving the problem that the dynamic range of the camera is insufficient, there is a method of obtaining a composite image having a high range by combining pixels having different sensitivity characteristics. In this method, by using pixels having different sensitivities, it is possible to obtain an image in which bright spots to dark spots are captured, that is, an image without blown-out highlights or blocked-up shadows can be obtained. In addition, this method has an advantage that there is no problem of alignment even if the subject or the like moves, as compared with the above-described method of combining a plurality of images. On the other hand, since the imaging face includes a plurality of pixels, the pixel interval is wider as compared to that of pixels of a single sensitivity. That is, the spatial resolution is reduced. In a case where such an image is used as input for self-localization, a quantization error or a matching deviation due to a low resolution causes an error in self-localization, which causes a problem.

In view of problems as the above, an object of an image processing device according to an embodiment of the present disclosure is to improve the accuracy of self-localization without being affected by the content of a captured camera image. In particular, an object of the image processing device of the present disclosure is to avoid the influence of blown-out highlights or blocked-up shadows occurring in a camera image.

2. Functional Configuration Example

Figure 2:
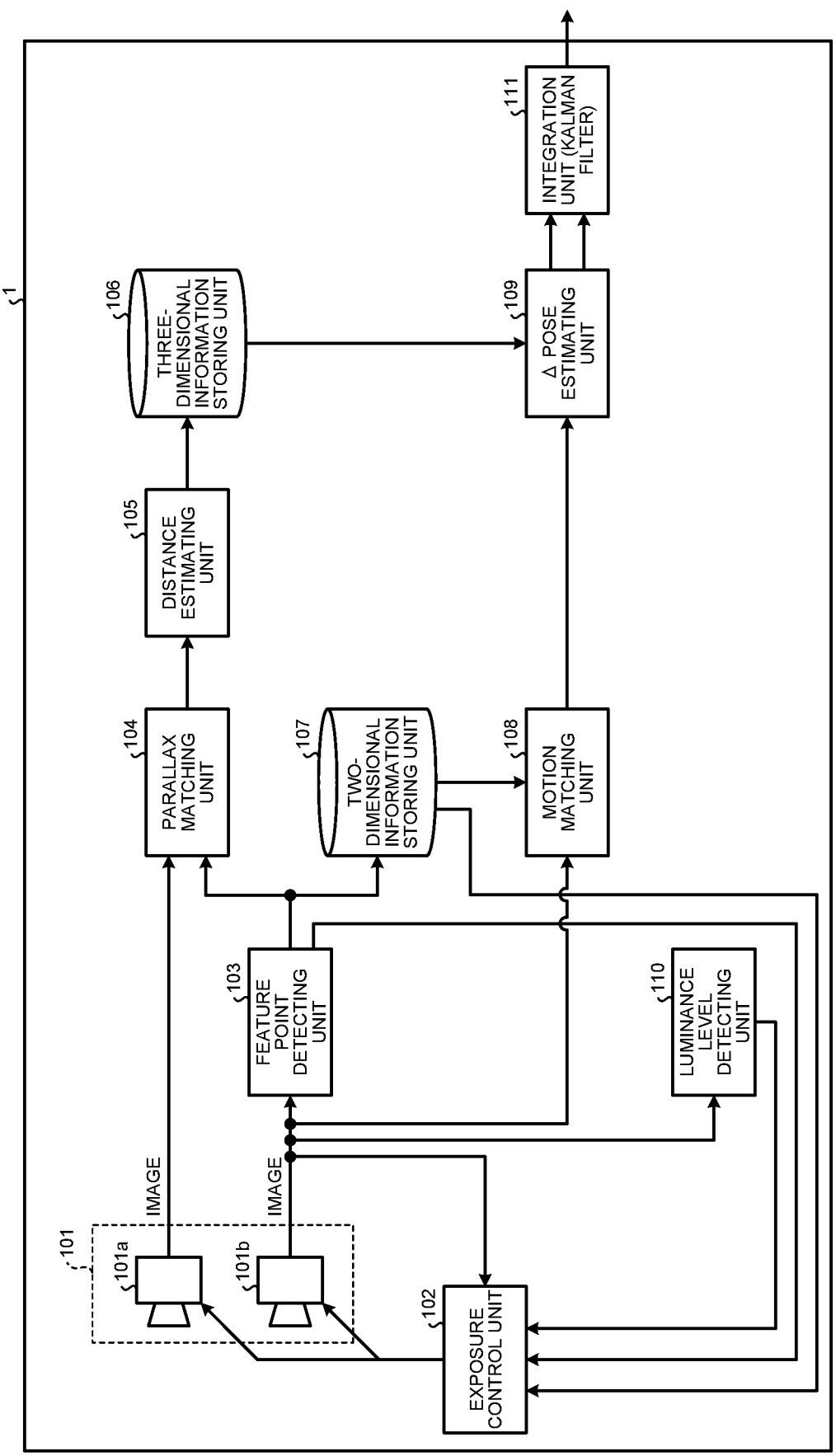
FIG. 2 is a diagram illustrating a configuration example of an image processing device according to an embodiment.

A configuration example of an image processing device 1 according to an embodiment will be described by referring to FIG. 2. FIG. 2 is a diagram illustrating a configuration example of the image processing device according to the embodiment.

As illustrated in FIG. 2, the image processing device 1 includes an imaging unit 101, an exposure control unit 102, a feature point detecting unit 103, a parallax matching unit 104, a distance estimating unit 105, a three-dimensional information storing unit 106, and a two-dimensional information storing unit 107. Furthermore, as illustrated in FIG. 2, the image processing device 1 includes a motion matching unit 108, a Δ pose estimating unit 109, a luminance level detecting unit 110, and an integration unit 111.

Each block (the imaging unit 101 to the integration unit 111) included in the image processing device 1 is implemented by a controller that controls each unit of the image processing device 1. The controller is implemented by, for example, a processor such as a central processing unit (CPU) or a micro processing unit (MPU). For example, the controller is implemented by a processor executing various programs stored in a storage device inside the image processing device 1 using a random access memory (RAM) or the like as a work area. Note that the controller may be implemented by an integrated circuit such as an application specific integrated circuit (ASIC) or a field programmable gate array (FPGA). Any of a CPU, an MPU, an ASIC, and an FPGA can be deemed as a controller.

Each of the blocks (the imaging unit 101 to the integration unit 111) included in the image processing device 1 is a functional block indicating a function of the image processing device 1. These functional blocks may be software blocks or hardware blocks. For example, each of the functional blocks described above may be one software module implemented by software (including microprograms) or may be one circuit block on a semiconductor chip (die). Of course, each of the functional blocks may be one processor or one integrated circuit. The functional blocks may be configured in any manner. Note that each of the blocks included in the image processing device 1 may be configured by a functional unit different from the example illustrated in FIG. 2.

The imaging unit 101 is implemented by a stereo camera including a camera 101a and a camera 102b. A camera image captured by the imaging unit 101 is appropriately processed by various corrections such as that of optical distortion and gain adjustment (such as peripheral light reduction correction) and then subjected to parallelization of offsetting an attitude shift between the stereo cameras. A camera image captured by the camera 101a is sent to the parallax matching unit 104 described later. A camera image captured by the camera 101b is sent to a feature point detecting unit 103 described later.

The exposure control unit 102 controls exposure of the imaging unit 101. Note that controlling the exposure of the imaging unit 101 means controlling the amount of light entering the imaging unit 101 (cameras 101a and 101b). Specifically, it is to control the brightness of a camera image as a result of adjusting the shutter speed (=exposure time), the sensitivity, the aperture, and the like.

The exposure control unit 102 selectively executes, for example, exposure control based on the luminance level of a camera image and exposure control by exposure correction depending on the size of the area of blown-out highlight and/or blocked-up shadow region(s) included in the camera image.

For example, in a case where the area of blown-out highlight and/or blocked-up shadow region(s) included in the camera image is less than or equal to a threshold value, the exposure control unit 102 controls the exposure so that the luminance level of the camera image detected by the luminance level detecting unit 110 is constant (at a target level). It is based on the premise that, in an environment where the area of the blown-out highlight and/or blocked-up shadow region(s) is smaller than or equal to the threshold value, that is, where the contrast is not high, there are cases where it is advantageous to continue imaging at a proper exposure in a case where a feature point is detected from an image frame.

When the luminance level is higher than the target level, the exposure control unit 102 controls the exposure of the imaging unit 101 so that the camera image becomes darker by, for example, a means of increasing the shutter speed. On the other hand, when the luminance level is lower than or equal to the target level, the exposure control unit 102 controls the exposure of the imaging unit 101 so that the camera image becomes brighter by, for example, a means of reducing the shutter speed.

The processing by the feature point detecting unit 103, the parallax matching unit 104, and the motion matching unit 108 described later cannot be performed when no feature point can be obtained from the camera image. In addition, in a case where no feature point can be obtained from the camera image, estimation of the self-position and orientation fails. Therefore, as described above, the exposure control unit 102 maintains the luminance of the camera image by controlling the exposure of the imaging unit 101 to be proper exposure depending on the luminance level of the camera image in order to cope with the change in the brightness of the environment in which the image processing device 1 is operated. In this manner, the occurrence of (a) blown-out highlight and/or blocked-up shadow region(s) in a camera image is suppressed as much as possible, and feature points of the camera image is prevented from being buried in the blown-out highlight and/or blocked-up shadow region(s), thereby enabling stable detection of feature points from the camera image.

Meanwhile, as described above, even when the exposure control is performed depending on the luminance level of the camera image, in a case where the image processing device 1 is operated in an environment with high contrast, there are cases where occurrence of (a) blown-out highlight and/or blocked-up shadow region(s) cannot be avoided due to the lack of dynamic range (see FIG. 1). In addition, in the above-described method of taking a plurality of camera images having different exposure levels and combining the camera images, there is a problem that an alignment error appears as noise on the image. In addition, in a method of obtaining a composite image of a wide range by combining pixels having different sensitivity characteristics, there is a problem that a quantization error increases due to a decrease in resolution. Furthermore, the processing by the distance estimating unit 105 and the Δ pose estimating unit 109 described later is based on the premise that each point on the camera image is captured at a geometrically correct position. Therefore, in a case where the resolution of the camera image decreases and there is an error (quantization error) between points on the camera image, this leads to an error in an estimation result of the self-position and orientation.

Therefore, in a case where the area of the blown-out highlight and/or blocked-up shadow region(s) included in the camera image is larger than the threshold value, the exposure control unit 102 sequentially performs positive correction of increasing the exposure from the proper exposure or negative correction of decreasing the exposure from the proper exposure according to a predetermined execution order. As a result, the exposure at the time of imaging by the imaging unit 101, that is, the exposure at the time of acquiring each of a plurality of image frames in time series is controlled. It is based on the premise that, under an environment where the area of the blown-out highlight and/or blocked-up shadow region(s) is larger than the threshold value, that is, under an environment where the contrast is high, it is difficult to stably extract feature points from the camera image in the imaging at the proper exposure. As a result, the exposure control of the camera image is performed so as to compensate for the lack of dynamic range and to stably detect feature points from the camera image even under the environment with high contrast.

For example, a pattern in which positive correction (overexposure) or negative correction (underexposure) are alternately performed can be adopted as a predetermined execution order. In this case, in a case where the area of the blown-out highlight and/or blocked-up shadow region(s) included in the camera image is larger than the threshold value, the exposure control unit 102 alternately performs, for example, positive correction (overexposure) and negative correction (underexposure) (see FIG. 3 described later). As a result, exposure correction of either the positive correction or the negative correction is alternately performed in synchronization with imaging processing by the imaging unit 101, and an image frame subjected to the positive correction and an image frame subjected to the negative correction are alternately acquired.

For example, in a case where the frame rate is 60 frames/second, the exposure control unit 102 performs exposure control so that underexposure and overexposure are alternately repeated periodically in synchronization with acquisition of an image frame for every one-sixtieth seconds. That is, as the exposure correction for image frames, underexposure and overexposure are alternately applied to every other frame. The exposure control unit 102 can control the exposure, for example, by calculating a proper exposure (exposure value) from the luminance level detected by the luminance level detecting unit 110 and applying positive correction or negative correction to the proper exposure using a predetermined correction value.

By alternately performing either the positive correction (overexposure) or the negative correction (underexposure) on every other image frame, feature points included in the blown-out highlight region and the blocked-up shadow region can be efficiently detected. Note that regarding the execution order when the positive correction and the negative correction are alternately executed, as to which exposure correction of the positive correction and the negative correction is executed first can be set in accordance with any desired rule. For example, in a case where only the blown-out highlight region exceeds the threshold value, it is conceivable to set the execution order so that the negative correction is executed first in order to detect many feature points including feature points latent in the blown-out highlight region from the camera image. Meanwhile, in a case where only the blocked-up shadow region exceeds the threshold value, it is conceivable to set the execution order so that the positive correction is executed first in order to detect many feature points including feature points latent in the blocked-up shadow region from the camera image. Note that in a case where both the blown-out highlight region and the blocked-up shadow region exceed the threshold value, which of the positive correction and the negative correction is executed first may be randomly set.

Furthermore, the exposure control unit 102 may perform either the positive correction or the negative correction for every other frame on the basis of the number of feature points included in an image frame. As described above, by alternately performing the positive correction and the negative correction for every other frame, it is possible to know which one of the camera image subjected to the positive correction and the camera image subjected to the negative correction includes more feature points.

Therefore, the exposure control unit 102 may modify the execution order of the positive correction and the negative correction on the basis of the ratio between the number of feature points included in the image frame subjected to the positive correction and the number of feature points included in the image frame subjected to the negative correction. In general, the number of feature points detected from an overexposed camera image is compared with the number of feature points detected from an underexposed camera image, and if there is a difference in the number of feature points included in the camera images, it is considered to be more advantageous for the estimation of the self-position and orientation to use the image including more feature points.

Specifically, the exposure control unit 102 determines that the number of feature points included in an image frame subjected to the positive correction is greater than the number of feature points included in an image frame subjected to the negative correction. In this case, the exposure control unit 102 modifies the execution order of the positive correction and the negative correction so that more image frames subjected to the positive correction are acquired than image frames subjected to the negative correction. That is, the execution ratio of the positive correction is increased as compared to that of the negative correction. On the other hand, the exposure control unit 102 determines that the number of feature points included in an image frame subjected to the positive correction is smaller than the number of feature points included in an image frame subjected to the negative correction. In this case, the exposure control unit 102 modifies the execution order of the positive correction and the negative correction so that more image frames subjected to the negative correction are acquired than image frames subjected to the positive correction. That is, the execution ratio of the negative correction is increased as compared to that of the positive correction.

For example, that the exposure control unit 102 determines that the ratio of the number of feature points included in an image frame subjected to the positive correction to the number of feature points included in an image frame subjected to the negative correction is 1 to 2. In this case, the exposure control unit 102 modifies the execution order of the positive correction and the negative correction so that the positive correction and the negative correction are sequentially executed at a ratio of 1 to 2. That is, the execution order is modified so that negative correction (underexposure)→negative correction (underexposure)→positive correction (overexposure) are periodically repeated (see, for example, FIG. 4 described below). Note that if the positive correction and the negative correction are performed in order at a ratio of 1 to 2, the execution order can be modified to any order. For example, the execution order may be modified so that negative correction (underexposure)→positive correction (overexposure)→negative correction (underexposure) are periodically repeated.

Note that the control of the execution ratio of the positive correction and the negative correction by the exposure control unit 102 can also be expressed by a cycle in which these image frames are input on the basis of image frames (of coordinated exposure) to be input to the Δ pose estimating unit 109. For example, in a case where the frame rate at which image frames are acquired by the imaging unit 101 is 60 (fps) and the positive correction (overexposure) and the negative correction (underexposure) are alternately repeated, that is, when the execution ratio of the positive correction (overexposure)/the negative correction (underexposure) is 1:1, focusing only on the image frame on the positive correction (overexposure) side, the frame period of the image frame on the positive correction (overexposure) side can be expressed as 1/30 (seconds). On the other hand, when attention is paid only to the image frames on the negative correction (underexposure) side, the frame period of the image frames on the negative correction (underexposure) side can be expressed as 1/30 (seconds). Furthermore, in a case where the frame rate is 60 (fps) and the execution ratio of the positive correction (overexposure) to the negative correction (underexposure) is 2:1, focusing only on the image frames on the positive correction (overexposure) side, the frame period of the image frames on the positive correction (overexposure) side can be expressed as 1/60 (seconds) and 1/30 (seconds). On the other hand, when attention is paid only to the image frames on the negative correction (underexposure) side, the frame period of the image frames on the negative correction (underexposure) side can be expressed as 1/20 (seconds).

The feature point detecting unit 103 detects feature points that can be used for estimation of the self-position and orientation (the position and orientation of the image processing device 1). A feature point typically corresponds to a region on a camera image having high contrast and having no similar structure in the surroundings. The feature points can be matched due to their uniqueness and are used for processing based on the function of the motion matching unit 108 described later. The feature point detecting unit 103 stores the positions of respective feature points on a camera image captured by the camera 101b in the two-dimensional information storing unit 107 as two-dimensional position information.

For each of feature points (first feature point group) on one of camera images detected by the feature point detecting unit 103, the parallax matching unit 104 searches for a corresponding point (second feature point group) from the other camera image. The parallax matching unit 104 executes the search for the second feature point group corresponding to the first feature point group from the other camera image by template matching. For example, the first feature point group on the camera image captured by the camera 101a and the second feature point group on the camera image captured by the camera 101b can be rephrased as the same object viewed from two viewpoints. Based on the first feature point group in one camera image and the second feature point group in the other camera image, the parallax matching unit 104 obtains parallax that is a difference in appearance when the same object is viewed from the camera 101a and the camera 101b.

The distance estimating unit 105 obtains the distance to each of the feature points (the camera 101a and the camera 101b) on the basis of the parallax of each of the feature points obtained by the parallax matching unit 104. If the installation interval between the camera 101a and the camera 101b is known, the distance estimating unit 105 can calculate the distance to each of the feature points (the camera 101a and the camera 101b) on the basis of the principle of triangulation. The distance estimating unit 105 obtains the distance to each of the feature points (the camera 101a and the camera 101b), then obtains the position of each of the feature points in a three-dimensional space and stores the position in the three-dimensional information storing unit 106 as three-dimensional position information.

The three-dimensional position information stored in the three-dimensional information storing unit 106 and the two-dimensional position information stored in the two-dimensional information storing unit 107 are used as previous camera images serving as references for changes in the self-position and orientation (pose difference (Δ pose)). The three-dimensional information storing unit 106 and the two-dimensional information storing unit 107 are implemented by a storage device capable of reading and writing data, such as a DRAM, an SRAM, a flash memory, or a hard disk.

When a next image in terms of time is captured by the imaging unit 101, the motion matching unit 108 searches for corresponding points from the current camera image for each of the feature points on the previous camera image based on the two-dimensional position information stored in the two-dimensional information storing unit 107. The motion matching unit 108 executes the search for points corresponding to the respective feature points on the previous camera image from the current camera image by template matching, for example. The points, which have been searched from the current camera image, corresponding to the respective feature points on the previous camera image correspond to points when the same object is viewed from the camera 101a and the camera 101b. The difference in appearance is due to temporal changes in the position and orientation of the image processing device 1 (the camera 101a and the camera 101b). The two-dimensional position information of the points, which have been searched from the current camera image by the motion matching unit 108, corresponding to the respective feature points on the previous camera image is sent to the Δ pose estimating unit 109.

The Δ pose estimating unit 109 estimates first position and orientation of the image processing device 1 based on matching between image frames subjected to the positive correction and second position and orientation of the image processing device 1 based on matching between image frames subjected to the negative correction. The first position and orientation and the second position and orientation correspond to changes (pose difference, also referred to as Δ pose) in the position and orientation of the image processing device 1 (the camera 101a and the camera 101b) from the previous image capturing time to the current image capturing time. The first position and orientation and the second position and orientation include, for example, information of three degrees of freedom indicating a change in position of the image processing device 1 and information of three degrees of freedom indicating a change in rotation of the image processing device 1. On the basis of three-dimensional position information of each of the feature points on a previous camera image and two-dimensional position information of corresponding points on the current camera image, the Δ pose estimating unit 109 can estimate a change in the position and orientation (pose difference) of the image processing device 1 by, for example, the following method.

That is, when a point group (three-dimensional position) in a three-dimensional space and a point group (two-dimensional position) on a two-dimensional plane obtained by projecting the point group in the three-dimensional space are given, the position and orientation of the projection plane can be obtained by solving a minimization problem in which an error caused when the three-dimensional position is projected to the two-dimensional position is a cost. That is, it is based on the premise that the position and orientation of the projection plane are the position and orientation of the image processing device 1 (the camera 101a and the camera 101b) and that the three-dimensional position of each of the feature points on the previous camera image and the two-dimensional positions of the corresponding points on the current camera image are known. Then, a minimization problem is solved in which an error on the camera image when the three-dimensional position of each of the feature points on the previous camera image is projected onto the two-dimensional positions of the corresponding points on the current camera image is used as a cost. As a result, it is possible to estimate changes in the position and orientation of the image processing device 1 (the camera 101a and the camera 101b) from the previous image capturing time to the current image capturing time. Note that the three-dimensional position information of each of the feature points on the previous camera image is acquired from the three-dimensional information storing unit 106, and the two-dimensional position information of the corresponding points on the current camera image is acquired from the motion matching unit 108.

The first position and orientation (pose difference) and the second position and orientation (pose difference) of the image processing device 1, which are estimation results of the Δ pose estimating unit 109, are each sent to the integration unit 111.

The luminance level detecting unit 110 detects the luminance level of the camera image captured by the camera 101b, for example, by pixel integration or the like. The luminance level of the camera image detected by the luminance level detecting unit 110 is sent to the exposure control unit 102.

The integration unit 111 integrates the pose differences acquired from the Δ pose estimating unit 109 by filtering processing such as that by a Kalman filter.

<2-1. Operation Example (1) of Image Processing Device>

Figure 3:
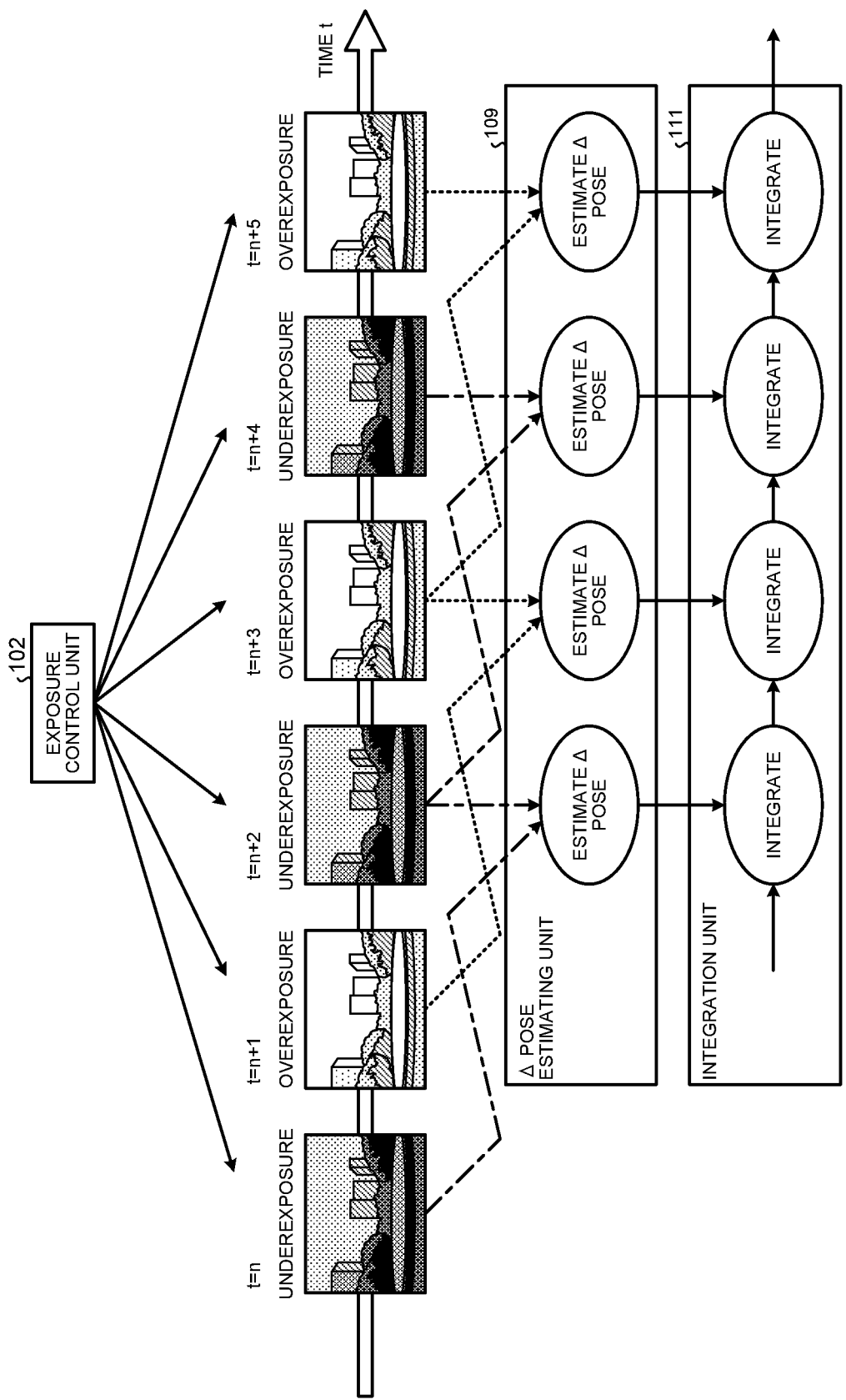
FIG. 3 is a diagram illustrating an operation example of the image processing device according to the embodiment.
Figure 4:
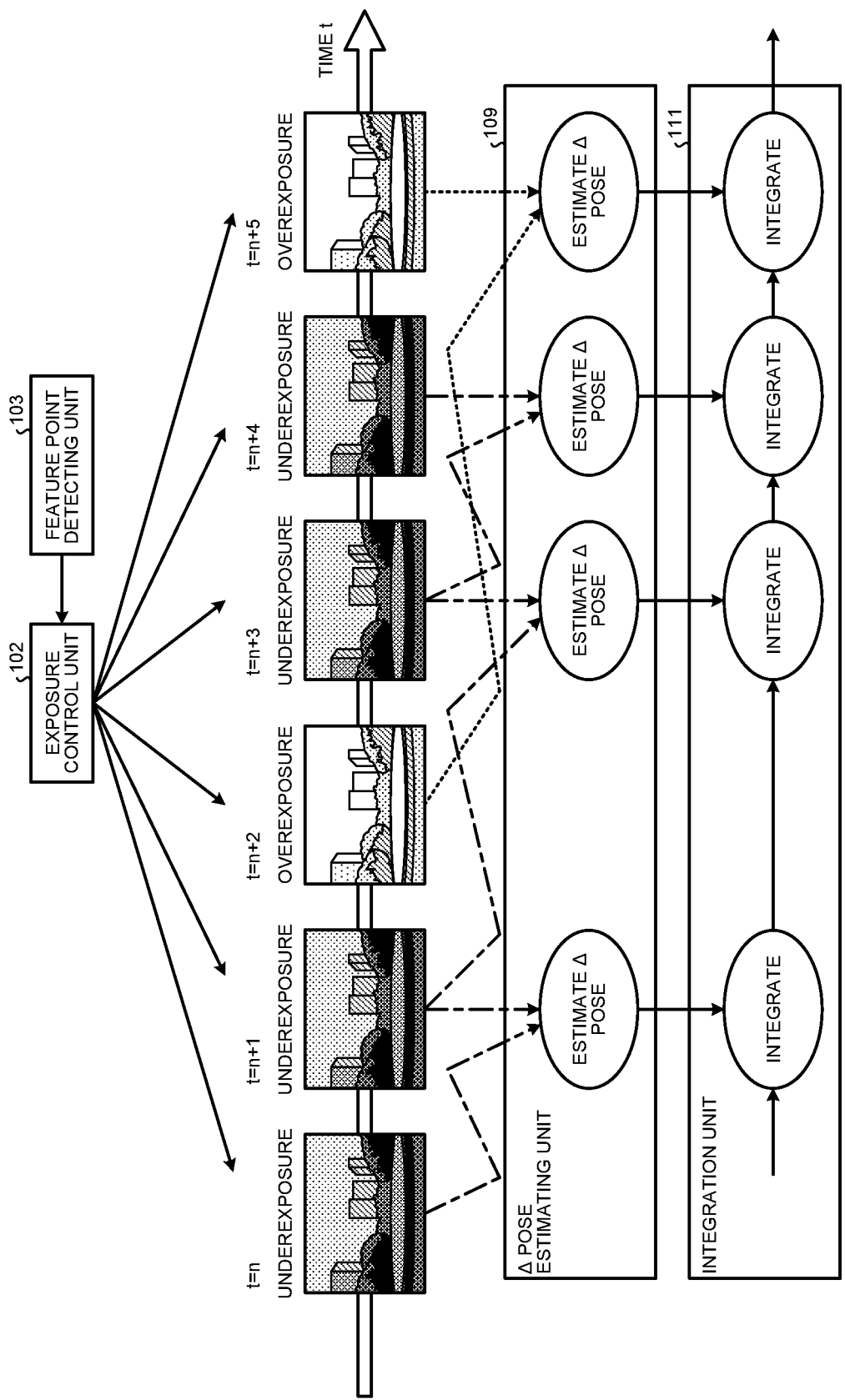
FIG. 4 is a diagram illustrating an operation example of the image processing device according to the embodiment.

An operation example of the image processing device 1 will be described with reference to FIGS. 3 and 4. FIGS. 3 and 4 are diagrams illustrating an operation example of the image processing device according to the embodiment.

FIG. 3 is a diagram illustrating an operation example in a case where exposure is controlled so that underexposure (negative correction) and overexposure (positive correction) are periodically and alternately repeated for every other image frame.

As illustrated in FIG. 3, in a case where the area of the blown-out highlight or blocked-up shadow regions included in a camera image is larger than a threshold value, the exposure control unit 102 performs exposure control so as to periodically repeat underexposure and overexposure alternately for every other image frame. The exposure control unit 102 alternately performs underexposure (negative correction) and overexposure (positive correction) by following a predetermined execution order. That is, in a case where the frame rate is 60 frames/second, the exposure control unit 102 performs exposure control so that underexposure and overexposure are alternately repeated periodically in synchronization with acquisition of an image frame for every one-sixtieth seconds. The exposure control unit 102 can control the exposure, for example, by calculating a proper exposure (exposure value) from the luminance level detected by the luminance level detecting unit 110 and applying positive correction or negative correction to the proper exposure using a predetermined correction value.

The parallax matching unit 104, the distance estimating unit 105, and the motion matching unit 108 perform matching between image frames having the same exposure for camera input that alternately repeats underexposure (negative correction) and overexposure (positive correction) for every other image frame.

The Δ pose estimating unit 109 alternately estimates a pose difference (an example of the first position and orientation) based on underexposed image frames and a pose difference (an example of the second position and orientation) based on overexposed image frames. The Δ pose estimating unit 109 solves the minimization problem in which an error on the camera image when the three-dimensional position of each of the feature points on the previous camera image is projected onto the two-dimensional positions of the corresponding points on the current camera image is used as a cost. As a result, it is possible to estimate changes in the position and orientation of the image processing device 1 (the camera 101a and the camera 101b) from the previous image capturing time to the current image capturing time, that is, a pose difference.

The integration unit 111 integrates pose differences estimated between the image frames having the same exposure by filtering processing such as a Kalman filter. The Kalman filter is a filter that integrates a plurality of observations (pose differences) having a modeled error probability distribution (error variance) and estimates the current state having the highest likelihood. The Kalman filter integrates two pose differences input thereto, that is, a pose difference obtained from a pair of underexposed image frames and a pose difference obtained from a pair of overexposed image frames and estimates a pose difference with the highest likelihood as the current state. The Kalman filter updates the state by the following Equations (1) and (2).

State quantity after observation=state quantity before observation+error variance of state quantity before observation÷(error variance of state quantity before observation+error variance of observation value)×(observation value−predictive value)     (1)

Error variance of the state quantity after observation=error variance of observation value÷(error variance of state quantity before observation+error variance of observation value)×error variance of state quantity before observation     (2)

In the above Equations (1) and (2), the observation value corresponds to the pose difference estimated by the Δ pose estimating unit 109. The predictive value in the above equation (1) can be obtained by linear interpolation from the previous state. Alternatively, in a case where the image processing device 1 includes an inertial measurement unit (IMU) and the IMU is used in combination with the camera 101a and the camera 101b, the predictive value in the above Equation (1) can be obtained from an integral value of a detection value of the IMU.

In the above Equations (1) and (2), the error variance of the observation value can be obtained as a reciprocal (inverse matrix) of a partial derivative (matrix since it is a multivariable) representing an inclination to an optimal solution in estimating the pose difference (solving the minimization problem). That is, the error variance of the observation value is obtained by an inverse matrix of a matrix indicating the inclination to the optimal solution in solving the minimization problem for estimating the pose difference. For example, a small inclination to the optimum solution means that the sensitivity to an error is low, and an error variance of the reciprocal thereof is large. On the other hand, when the inclination is large, the sensitivity to an error is high, and the error variance is small.

Although the case where the integration unit 111 integrates the plurality of observations (pose differences) by the filter processing by the Kalman filter has been described, the plurality of observations may be integrated by a particle filter or simpler weighting.

<2-2. Operation Example (2) of Image Processing Device>

FIG. 4 is a diagram illustrating an operation example in a case where the execution order of the positive correction and the negative correction is modified depending on the number of feature points included in an image frame, and the exposure control is performed in the modified execution order. For example, the number of feature points detected from a camera image with overexposure (positive correction) is compared with the number of feature points detected from a camera image with underexposure (negative correction). As a result, if the number of feature points included in one of the camera images is larger, using a camera image having more feature points is considered to be more advantageous for the estimation of the self-position and orientation. Therefore, the execution order of the positive correction and the negative correction may be modified using the detected number of feature points as an index.

In FIG. 4, illustrated is an example of a case where the exposure control is performed by modifying the execution ratio of positive correction and negative correction in a case where it is determined that there are more feature points in an underexposed camera image as a result of comparing the underexposed camera image and an overexposed camera image as input.

The number of feature points detected from a camera image is excellent as an index for obtaining the brightness of the camera image optimal for the estimation of the self-position and orientation. However, from a camera image in which blown-out highlights or blocked-up shadows occur, it is not possible to know what type of feature point is latent in the region in which the blown-out highlights or the blocked-up shadows occur. For this reason, it is not possible to determine whether to increase the exposure to brighten the camera image or to decrease the exposure to darken the camera image, and it is difficult to use the number of feature points for exposure control in the conventional technology.

On the other hand, since the image processing device 1 according to the embodiment of the present disclosure captures both an underexposed camera image and an overexposed camera image, it is possible to grasp the number of feature points latent in the region where blown-out highlights and blocked-up shadows occur in a camera image captured with proper exposure. In this manner, the image processing device 1 according to the embodiment of the present disclosure can use the number of feature points that can be detected from camera images for exposure control.

As a method of determining the execution order of the underexposure (negative correction) or the overexposure (positive correction), a method of determining based on the ratio of the number of feature points detected with each of them can be adopted. For example, let us presume that the ratio of the number of feature points obtained from the most recent underexposed camera image to the number of feature points obtained from the most recent overexposed camera image is 2:1. In this case, the exposure control unit 102 modifies the execution order of the positive correction (overexposure) and the negative correction (underexposure) so that the positive correction and the negative correction are sequentially performed at a ratio of 1 to 2. That is, as illustrated in FIG. 4, the execution order is modified so that negative correction (underexposure)→negative correction (underexposure)→positive correction (overexposure) are periodically repeated. Note that if the positive correction and the negative correction are performed in order at a ratio of 1 to 2, the execution order can be modified to any order. For example, the execution order may be modified so that negative correction (underexposure)→positive correction (overexposure)→negative correction (underexposure) are periodically repeated.

Note that the method of determining the execution ratio of the negative correction and the positive correction allocated to image frames is not necessarily particularly limited in this example. In addition, the frames to be compared for the number of feature points may not be limited to the most recent frame for each, and for example, the number of feature points included in a plurality of underexposed image frames and the number of feature points included in a plurality of overexposed image frames may be averaged in the time direction and thereby used. Furthermore, as the number of feature points, the number of feature points that have been matched, among feature points detected from the camera images, may be adopted.

Note that, depending on the ratio of the number of feature points, the execution ratio of the negative correction and the positive correction implemented as the exposure correction in synchronization with imaging by the imaging unit 101 may be unbalanced without limit such as 100:1. However, as described above, for the purpose of knowing how many feature points are latent in the region where blown-out highlights or blocked-up shadows occur, it is desirable that imaging is performed with one of the positive correction or the negative correction at least once in a certain period of time. That is, for the execution ratio of the positive correction and the negative correction, a lower limit may be set for a side of which ratio of being performed is less.

For example, in a case where it is based on a premise that the frame rate is 60 (fps) and the execution ratio of the positive correction (overexposure) to the negative correction (underexposure) is 119:1, the negative correction (underexposure) is input once in 120 frames (once in 2 seconds). Therefore, when attention is paid only to the negative correction (underexposure), the frame rate at which image frames of the negative correction (underexposure) are acquired can be expressed as 0.5 (fps). At this time, the image frames of the negative correction (underexposure) correspond to the side of which ratio of being performed is less, and it is desirable that control is performed so that imaging is performed with one of the positive correction or the negative correction at least once in a certain period of time by setting a lower limit for the ratio. The lower limit on the side of which ratio of being performed is less can be rephrased as a lower limit of an input frame rate of each of the positive correction (overexposure) and the negative correction (underexposure) to the Δ pose estimating unit 109. Then, in a case where the lower limit of the input frame rate of each of the positive correction (overexposure) and the negative correction (underexposure) to the Δ pose estimating unit 109 is set to 10 (fps), it is possible to perform control so that imaging with exposure of the positive correction (overexposure) or the negative correction (underexposure) is performed once in six frames.

The lower limit of the ratio of being performed may be determined at a constant value or may be dynamically modified depending on the change amount (speed) of the self-position and orientation to be estimated. When an overlapping region of the field of view between frames decreases, the matching processing by the motion matching unit 108 becomes difficult. Therefore, the lower limit of the ratio may be increased if the speed is high so as to ensure that sufficient overlapping of the field of view is obtained even on the side of which ratio of being performed is less, and the lower limit of the ratio may be decreased if the speed is low.

The number of feature points is also useful in determining how much the target level is to be negatively corrected or positively corrected (underexposed or overexposed) with respect to the proper exposure. For example, it is conceivable to try a slight negative correction (or positive correction) and correct a correction value more greatly if the increase or decrease in the number of feature points is slight as compared with that at the proper exposure.

In addition, the above description has been given on an example in which each of the underexposure and the overexposure is performed step by step; however, each of the underexposure and the overexposure may be performed by a plurality of steps of brightness. That is, in addition to underexposure or overexposure, darker underexposure or brighter overexposure may be used for imaging in order, and these images may be used.

3. Processing Procedure Example

Figure 5:
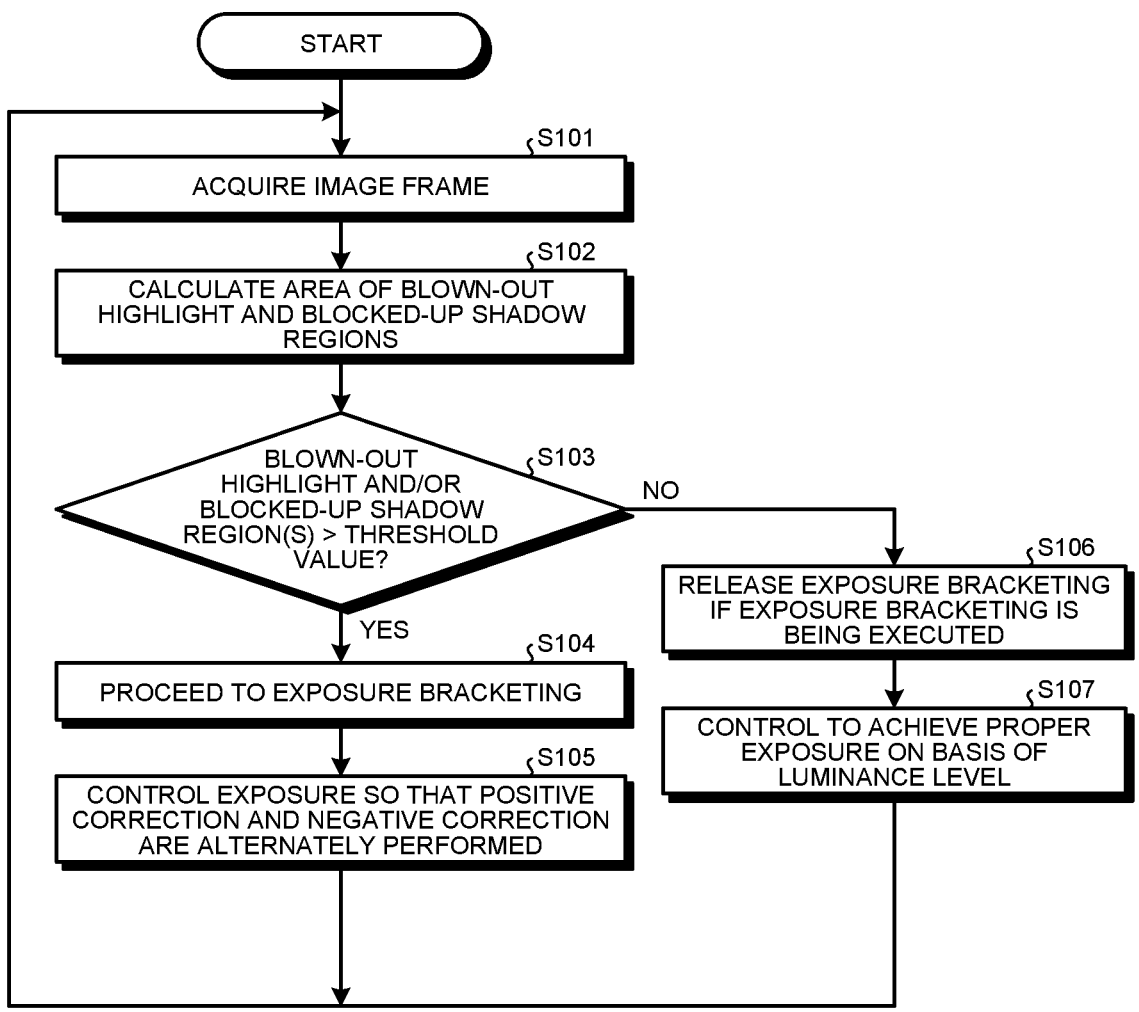
FIG. 5 is a flowchart illustrating an example of a processing procedure of the image processing device according to the embodiment.
Figure 6:
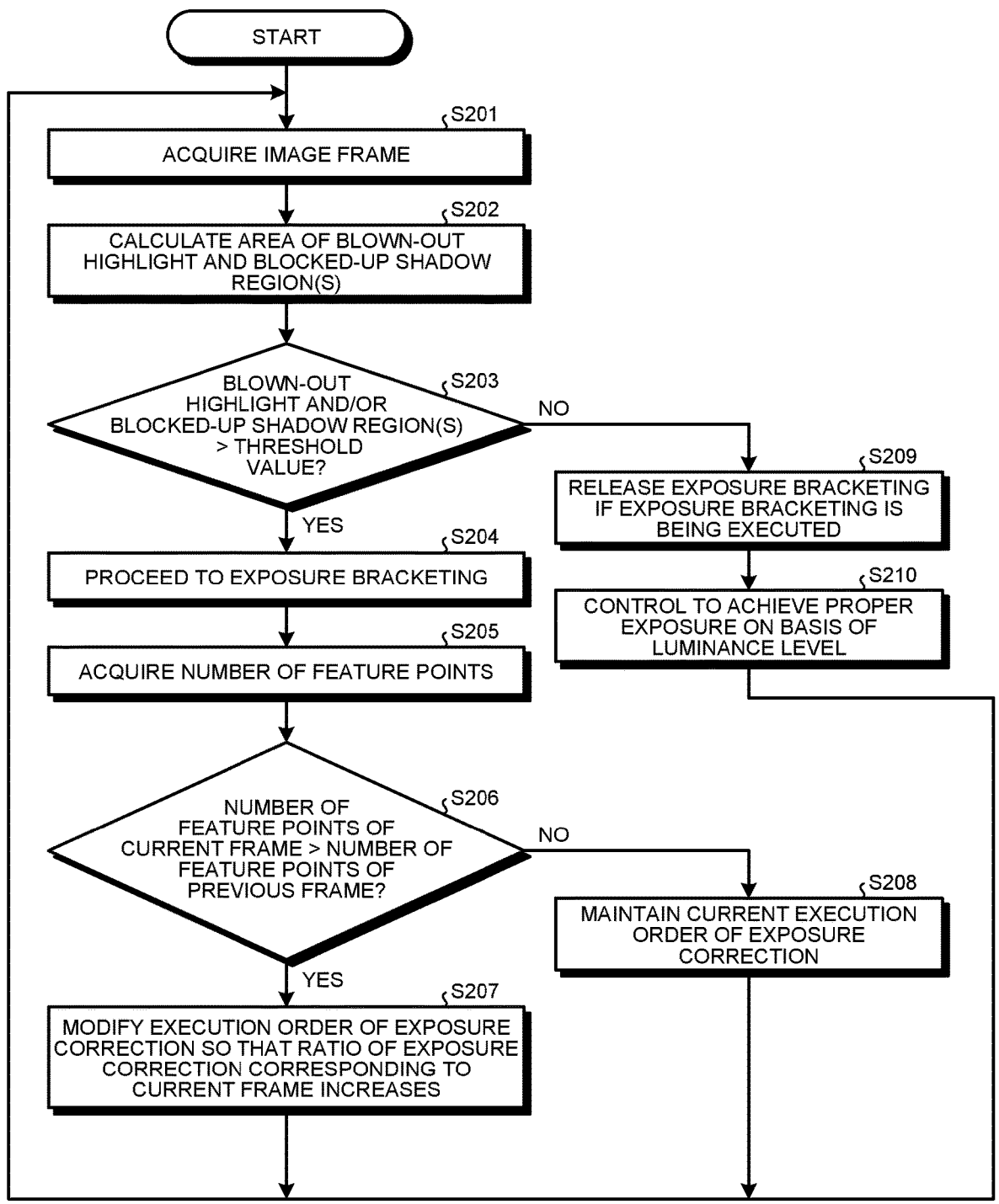
FIG. 6 is a flowchart illustrating an example of a processing procedure of the image processing device according to the embodiment.

A processing procedure example of the image processing device 1 according to the embodiment will be described with reference to FIGS. 5 and 6. FIGS. 5 and 6 are flowcharts illustrating an example of a processing procedure performed by the image processing device according to the embodiment.

FIG. 5 is a flowchart illustrating an example of a procedure for controlling exposure by alternately performing positive correction and negative correction by the exposure control unit 102. As illustrated in FIG. 5, the exposure control unit 102 acquires an image frame from the imaging unit 101 (step S101) and calculates an area of blown-out highlight and blocked-up shadow regions in the acquired image frame (step S102).

The exposure control unit 102 determines whether or not the area of the blown-out highlight and/or blocked-up shadow regions calculated in step S102 is larger than the threshold value (step S103).

If the exposure control unit 102 determines that the area of the blown-out highlight and/or blocked-up shadow regions is larger than the threshold value (step S103; Yes), the process proceeds to exposure bracketing (step S104).

The exposure control unit 102 controls the exposure so that the positive correction and the negative correction are alternately performed (step S105). That is, the exposure control unit 102 alternately performs underexposure (negative correction) and overexposure (positive correction) by following a predetermined execution order. That is, in a case where the frame rate is 60 frames/second, the exposure control unit 102 performs exposure control so that underexposure and overexposure are alternately repeated periodically in synchronization with acquisition of an image frame for every one-sixtieth seconds. Then, the exposure control unit 102 returns to the processing procedure of step S101 described above.

In the above step S103, if the exposure control unit 102 determines that the area of the blown-out highlight and/or blocked-up shadow regions is less than or equal to the threshold value (step S103; No), if the exposure bracketing is being executed, the exposure bracketing is released (step S106).

Then, the exposure control unit 102 controls to achieve proper exposure on the basis of the luminance level of the camera image (step S107) and returns to the processing procedure of step S101 described above.

FIG. 6 illustrates an example of a procedure in which the exposure control unit 102 modifies the execution order of the positive correction or the negative correction depending on the number of feature points included in a camera image and controls the exposure in the modified execution order. As illustrated in FIG. 6, the exposure control unit 102 acquires an image frame from the imaging unit 101 (step S201) and calculates an area of blown-out highlight and blocked-up shadow regions in the acquired image frame (step S202).

The exposure control unit 102 determines whether or not the area of the blown-out highlight and/or blocked-up shadow regions calculated in step S202 is larger than the threshold value (step S203).

If the exposure control unit 102 determines that the area of the blown-out highlight and/or blocked-up shadow regions is larger than the threshold value (step S203; Yes), the process proceeds to exposure bracketing (step S204).

The exposure control unit 102 acquires the number of feature points of the current frame and the number of feature points of a previous frame (step S205). The previous frame corresponds to, for example, an image frame immediately before the current frame.

The exposure control unit 102 determines whether or not the number of feature points of the current frame is larger than the number of feature points of the previous frame (step S206).

If it is determined that the number of feature points of the current frame is larger than the number of feature points of the previous frame (step S206; Yes), the exposure control unit 102 modifies the execution order of the exposure correction so that the ratio of the exposure correction corresponding to the current frame increases (step S207). For example, let us presume that the exposure correction for the current frame is underexposure (negative correction), that the exposure correction for the previous frame is overexposure (positive correction), and that the ratio of the number of feature points of the current frame to the number of feature points of the previous frame is 2 to 1. In this case, the exposure control unit 102 modifies the execution order of the underexposure (negative correction) and the overexposure (positive correction) so that the negative correction and the positive correction are sequentially performed at a ratio of 2 to 1. That is, the execution order is modified so that underexposure (negative correction)→underexposure (negative correction)→overexposure (positive correction) are periodically repeated (see FIG. 4). Then, the exposure control unit 102 controls the exposure in the modified execution order in synchronization with the imaging by the imaging unit 101 and returns to the processing procedure of step S201.

If it is determined that the number of feature points of the current frame is less than or equal to the number of feature points of the previous frame (step S206; No), the exposure control unit 102 maintains the current execution order of exposure correction (step S208), and the processing returns to the processing procedure of step S201.

In the above step S203, if the exposure control unit 102 determines that the area of the blown-out highlight and/or blocked-up shadow regions is not less than or equal to the threshold value (step S203; No), if the exposure bracketing is being executed, the exposure bracketing is released (step S209).

Then, the exposure control unit 102 controls to achieve proper exposure on the basis of the luminance level of the camera image (step S210) and returns to the processing procedure of step S201 described above.

4. Modifications

Note that the above-described embodiment is an example, and various modifications and applications are possible.

<4-1. Modification Regarding Device Configuration>

Figure 7:
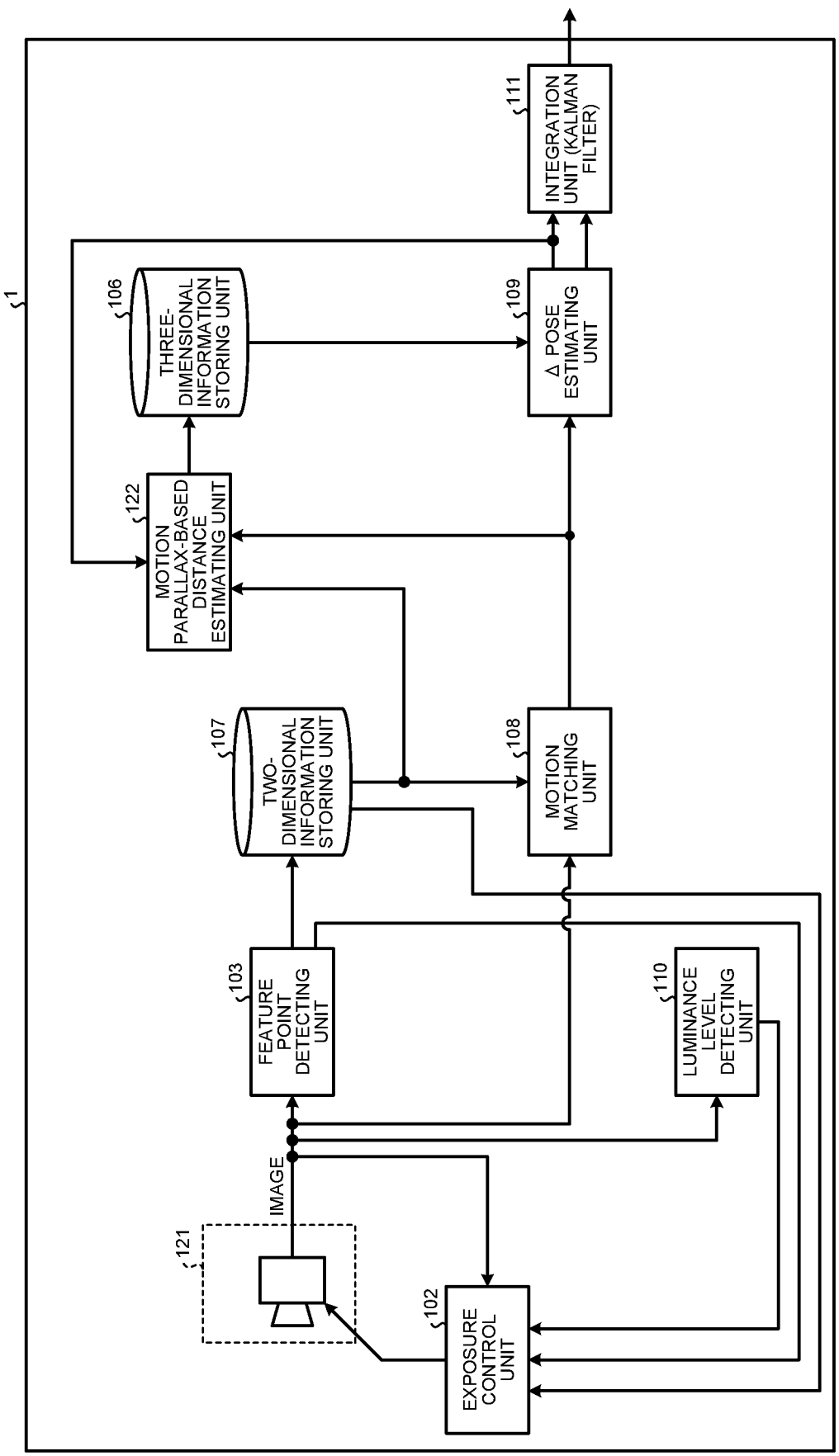
FIG. 7 is a diagram illustrating a configuration example of an image processing device according to a modification.

The image processing device 1 of the present embodiment is not limited to the device described in the above embodiment. FIG. 7 is a diagram illustrating a configuration example of an image processing device according to a modification. An image processing device 1 illustrated in FIG. 7 is different from the configuration example illustrated in FIG. 2 in the points described below.

As illustrated in FIG. 7, the image processing device 1 according to the modification may include an imaging unit 121 including a monocular camera instead of the imaging unit 101 (see FIG. 2) including the stereo camera. Furthermore, in a case where the imaging unit 121 includes a monocular camera, the image processing device 1 includes a motion parallax-based distance estimating unit 122 instead of the distance estimating unit 105. The motion parallax-based distance estimating unit 122 estimates the distance by motion parallax (parallax caused by the motion of the camera) from the combination of the two-dimensional position information of the corresponding point on the current image obtained by the motion matching unit 108 and the pose difference from the previous image capturing time to the current image capturing time obtained by the Δ pose estimating unit 109.

The image processing device 1 according to the modification is similar to the image processing device 1 according to the above-described embodiment with respect to other functional configurations except for the imaging unit 121 and the method of distance estimation by the motion parallax-based distance estimating unit 122 and can perform the exposure control described in the above embodiment.

<4-2. Modification Regarding Processing Procedure>

Figure 8:
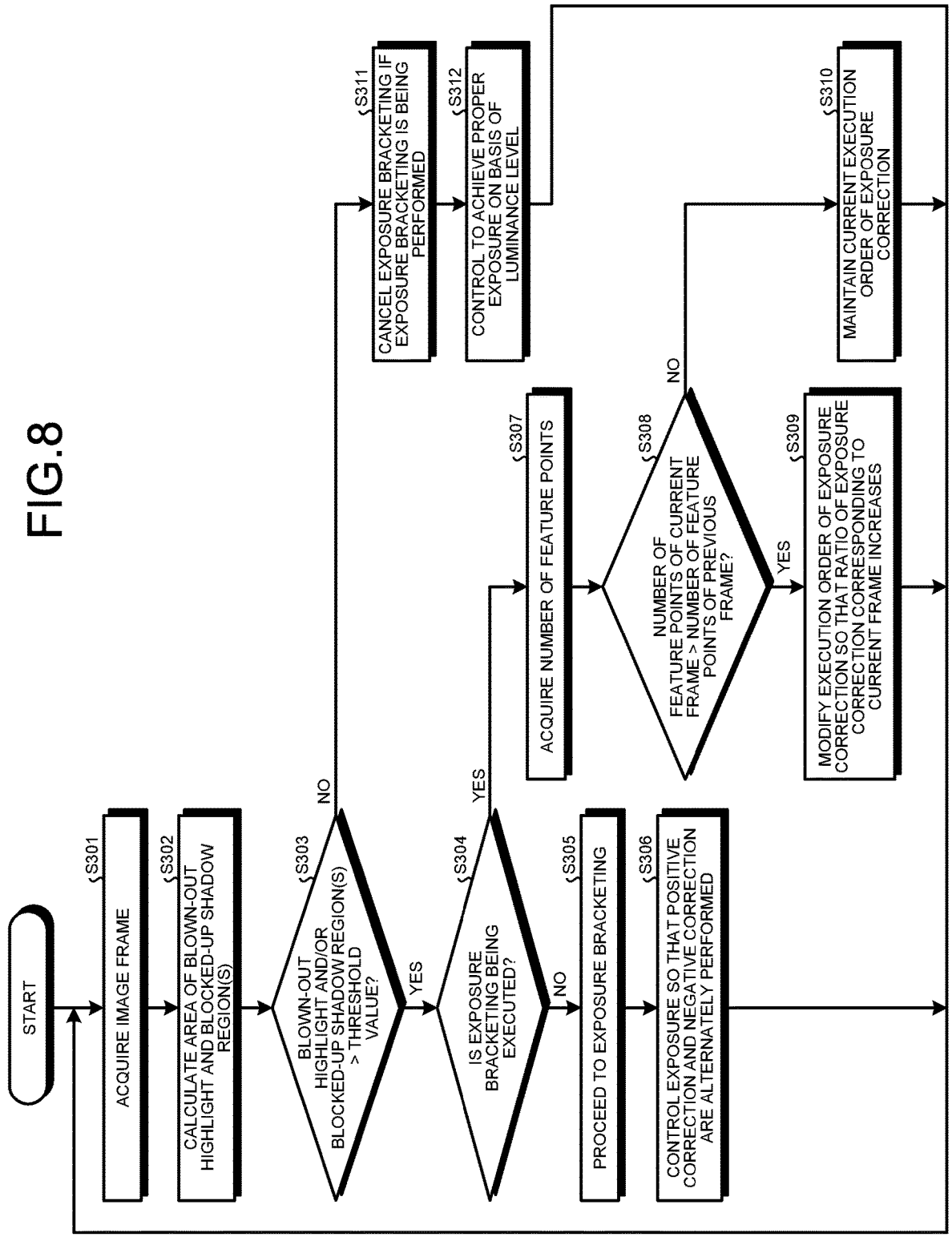
FIG. 8 is a flowchart illustrating an example of a processing procedure of an image processing device according to a modification.

In the above-described embodiment, the image processing device 1 may alternately perform the positive correction and the negative correction at the beginning of the transition to the exposure bracketing and perform the exposure correction based on the number of feature points after the feature points have been extracted from an image frame by the exposure bracketing. Hereinafter, a processing procedure example in that case will be described. FIG. 8 is a flowchart illustrating an example of a processing procedure of the image processing device 1 according to the modification.

As illustrated in FIG. 8, the exposure control unit 102 acquires an image frame from the imaging unit 101 (step S301) and calculates an area of blown-out highlight and blocked-up shadow regions in the acquired image frame (step S302).

The exposure control unit 102 determines whether or not the area of the blown-out highlight and/or blocked-up shadow regions calculated in step S302 is larger than the threshold value (step S303).

If the exposure control unit 102 determines that the area of the blown-out highlight and/or blocked-up shadow regions is larger than the threshold value (step S303; Yes), whether or not the exposure bracketing is being executed is determined (step S304).

When the exposure control unit 102 determines that the exposure bracketing is not being executed (step S304; No), the process proceeds to the exposure bracketing (step S305).

Then, the exposure control unit 102 controls the exposure so that the positive correction and the negative correction are alternately performed (step S306). That is, the exposure control unit 102 alternately performs underexposure (negative correction) and overexposure (positive correction) by following a predetermined execution order. That is, in a case where the frame rate is 60 frames/second, the exposure control unit 102 performs exposure control so that underexposure and overexposure are alternately repeated periodically in synchronization with acquisition of an image frame for every one-sixtieth seconds. Then, the exposure control unit 102 returns to the processing procedure of step S301 described above.

In step S304 described above, if the exposure control unit 102 determines that the exposure bracketing is being executed (step S304; Yes), the number of feature points of the current frame and the number of feature points of the previous frame are acquired (step S307). The previous frame corresponds to, for example, an image frame immediately before the current frame.

The, the exposure control unit 102 determines whether or not the number of feature points of the current frame is larger than the number of feature points of the previous frame (step S308).

If it is determined that the number of feature points of the current frame is larger than the number of feature points of the previous frame (step S308; Yes), the exposure control unit 102 modifies the execution order of the exposure correction so that the ratio of the exposure correction corresponding to the current frame increases (step S309). For example, let us presume that the exposure correction for the current frame is underexposure (negative correction), that the exposure correction for the previous frame is overexposure (positive correction), and that the ratio of the number of feature points of the current frame to the number of feature points of the previous frame is 2 to 1. In this case, the exposure control unit 102 modifies the execution order of the underexposure (negative correction) and the overexposure (positive correction) so that the negative correction (underexposure) and the positive correction (overexposure) are sequentially performed at a ratio of 2 to 1. That is, the execution order is modified so that underexposure (negative correction)→underexposure (negative correction)→overexposure (positive correction) are periodically repeated (see FIG. 4). Then, the exposure control unit 102 controls the exposure in the modified execution order in synchronization with the imaging by the imaging unit 101 and returns to the processing procedure of step S301.

On the other hand, if it is determined that the number of feature points of the current frame is less than or equal to the number of feature points of the previous frame (step S308; No), the exposure control unit 102 maintains the current execution order of exposure correction (step S310), and the processing returns to the processing procedure of step S301.

In the above step S303, if the exposure control unit 102 determines that the area of the blown-out highlight and/or blocked-up shadow regions is less than or equal to the threshold value (step S103; No), if the exposure bracketing is being executed, the exposure bracketing is released (step S311).

Then, the exposure control unit 102 controls to achieve proper exposure on the basis of the luminance level of the camera image (step S312) and returns to the processing procedure of step S301 described above.

<4-3. Others>

In the above embodiment, the image processing device 1 may determine whether or not the contrast ratio of a camera image is larger than a threshold value instead of determining whether or not the area of blown-out highlight and/or blocked-up shadow regions in an image frame is larger than the threshold value. As a result, it is not necessary to calculate the area of the blown-out highlight and/or blocked-up shadow regions in order to cope with a case where it is more advantageous to acquire an image frame with the proper exposure for extracting feature points.

Meanwhile, the image processing device 1 according to the embodiment may be implemented by a dedicated computer system or implemented by a general-purpose computer system.

For example, a program for executing the operation of the image processing device 1 of the embodiment can be stored and distributed in a computer-readable recording medium such as an optical disk, a semiconductor memory, a magnetic tape, or a flexible disk. Moreover, for example, a control device is configured by the program installed in a computer and the above processes executed. In this case, the control device may be the image processing device 1 according to the embodiment.

In addition, the program may be stored in a disk device included in a server device on a network such as the Internet so that the program can be downloaded to a computer. In addition, the above functions may be implemented by cooperation of an operating system (OS) and application software. In this case, a portion other than the OS may be stored in a medium and distributed, or a portion other than the OS may be stored in a server device to allow downloading or the like to a computer.

Among the processes described in the above embodiments, all or a part of the processes described as those performed automatically can be performed manually, or all or a part of the processes described as those performed manually can be performed automatically by a known method. In addition, a processing procedure, a specific name, and information including various types of data or parameters illustrated in the above or in the drawings can be modified as desired unless otherwise specified. For example, various types of information illustrated in the drawings are not limited to the information that has been illustrated.

In addition, each component of each device illustrated in the drawings is conceptual in terms of function and does not need to be necessarily physically configured as illustrated in the drawings. That is, the specific form of distribution and integration of devices is not limited to those illustrated in the drawings, and all or a part thereof can be functionally or physically distributed or integrated in any unit depending on various loads, use status, and the like.

In addition, the above embodiments can be combined as appropriate as long as the processing content does not contradict each other. In addition, the order of the steps illustrated in the sequence diagram or the flowchart of the present embodiment can be modified as appropriate.

Note that the self-position and orientation estimation technology implemented by the exposure control of the image processing device 1 according to the embodiment can be applied to any industrial fields such as autonomous driving in automobiles, surgery support, XR experience on stages, and the like.

5. Conclusion

As described above, according to an embodiment of the present disclosure, an image processing device 1 includes an exposure control unit 102, a Δ pose estimating unit 109 (an example of an estimating unit), and an integration unit 111. The exposure control unit 102 controls exposure by sequentially performing positive correction of increasing exposure from proper exposure or negative correction of decreasing exposure from the proper exposure as the exposure at a time of acquiring each of a plurality of image frames in time series in a predetermined execution order. The Δ pose estimating unit 109 estimates first position and orientation of the image processing device 1 based on matching between image frames subjected to the positive correction and second position and orientation of the image processing device 1 based on matching between image frames subjected to the negative correction. The integration unit 111 integrates the first position and orientation and the second position and orientation.

As a result, the accuracy of self-localization can be enhanced without being affected by the content of the captured camera image. That is, it is possible to avoid the influence of blown-out highlights or blocked-up shadows occurring in the camera image, to detect feature points from the camera image, and to improve the accuracy of self-localization.

For example, the image processing device 1 can alternately perform positive correction and negative correction. As a result, even in an environment with high contrast, it is possible to compensate for the lack of dynamic range and to perform exposure control capable of stably detecting feature points from the camera image.

Furthermore, for example, the image processing device 1 can modify the execution order on the basis of the ratio between the number of feature points included in an image frame subjected to the positive correction and the number of feature points included in an image frame subjected to the negative correction. As a result, even in an environment with high contrast, it is possible to compensate for the lack of dynamic range and to perform exposure control capable of more stably detecting feature points from the camera image.

Furthermore, for example, in a case where the number of feature points included in the image frame subjected to the positive correction is larger than the number of feature points included in the image frame subjected to the negative correction, the image processing device 1 can modify the execution order so that more image frames subjected to the positive correction are acquired than image frames subjected to the negative correction. On the other hand, in a case where the number of feature points included in the image frame subjected to the positive correction is smaller than the number of feature points included in the image frame subjected to the negative correction, the image processing device 1 can modify the execution order so that more image frames subjected to the negative correction are acquired than image frames subjected to the positive correction. As a result, even in an environment with high contrast, it is possible to compensate for the lack of the dynamic range and to perform exposure control capable of more stably detecting many feature points from the camera image.

Furthermore, for example, the image processing device 1 can determine whether or not to control the exposure in the execution order on the basis of the area of the blown-out highlight and/or blocked-up shadow region(s) included in an image frame captured with the proper exposure. As a result, it is possible to cope with a case where it is more advantageous to acquire an image frame with the proper exposure for extracting feature points in an environment where the contrast is not high.

Furthermore, for example, the image processing device 1 may determine whether or not to control the exposure in the execution order on the basis of the contrast ratio of the image frame captured with the proper exposure. As a result, it is not necessary to calculate the area of the blown-out highlight and/or blocked-up shadow regions in order to cope with a case where it is more advantageous to acquire an image frame with the proper exposure for extracting feature points.

Furthermore, for example, the image processing device 1 can integrate the first position and orientation and the second position and orientation by the Kalman filter. As a result, it is possible to obtain an estimation result of the self-position and orientation of the image processing device 1 from the feature points detected from the plurality of image frames having different exposure.

In addition, the first position and orientation and the second position and orientation include information of three degrees of freedom indicating a change in position of the image processing device 1 and information of three degrees of freedom indicating a change in rotation of the image processing device 1. As a result, it is possible to enhance the versatility to processing based on the estimation result of the self-position and orientation of the image processing device 1.

Although the embodiments of the present disclosure have been described above, the technical scope of the present disclosure is not limited to the above embodiments as they are, and various modifications can be made without departing from the gist of the present disclosure. In addition, components of different embodiments and modifications may be combined as appropriate.

Furthermore, the effects of the embodiments described herein are merely examples and are not limiting, and other effects may be achieved.

Note that the present technology can also have configurations as the following.

(1)
An image processing device comprising:
an exposure control unit that controls exposure by sequentially performing positive correction of increasing exposure from proper exposure or negative correction of decreasing exposure from the proper exposure as the exposure at a time of acquiring each of a plurality of image frames in time series in a predetermined execution order;
an estimating unit that estimates first position pose of the image processing device based on matching between image frames subjected to the positive correction and second position pose of the image processing device based on matching between image frames subjected to the negative correction; and
an integration unit that integrates the first position pose and the second position pose.

(2)
The image processing device according to (1),
wherein the exposure control unit
alternately performs the positive correction and the negative correction.

(3)
The image processing device according to (1),
wherein the exposure control unit
modifies the execution order on a basis of a ratio between the number of feature points included in the image frames subjected to the positive correction and the number of feature points included in the image frame subjected to the negative correction.

(4)
The image processing device according to (3),
wherein, in a case where the number of feature points included in the image frames subjected to the positive correction is larger than the number of feature points included in the image frames subjected to the negative correction, the exposure control unit
modifies the execution order so that more image frames subjected to the positive correction are acquired than image frames subjected to the negative correction, and
in a case where the number of feature points included in the image frames subjected to the positive correction is smaller than the number of feature points included in the image frames subjected to the negative correction, the exposure control unit
modifies the execution order so that more image frames subjected to the negative correction are acquired than image frames subjected to the positive correction.

(5)
The image processing device according to (1),
wherein the exposure control unit
determines whether or not to control the exposure in the execution order on a basis of an area of a blown-out highlight region and/or a blocked-up shadow region included in the image frame captured with the proper exposure.

(6)
The image processing device according to (1),
wherein the exposure control unit
determines whether or not to control the exposure in the execution order on a basis of a contrast ratio of the image frame captured with the proper exposure.

(7)
The image processing device according to (1),
wherein the integration unit
integrates the first position pose and the second position pose by a Kalman filter.

(8)
The image processing device according to (1),
wherein the first position pose and the second position pose include information of three degrees of freedom indicating a change in position of the image processing device and information of three degrees of freedom indicating a change in rotation of the image processing device.

(9)
An image processing method,
by an image processing device, comprising:
controlling exposure by sequentially performing positive correction of increasing exposure from proper exposure or negative correction of decreasing exposure from the proper exposure as the exposure at a time of acquiring each of a plurality of image frames in time series in a predetermined execution order;
estimating first position pose of the image processing device based on matching between image frames subjected to the positive correction and second position pose of the image processing device based on matching between image frames subjected to the negative correction; and
integrating the first position pose and the second position pose.

REFERENCE SIGNS LIST

1 IMAGE PROCESSING DEVICE
101 IMAGING UNIT
102 EXPOSURE CONTROL UNIT
103 FEATURE POINT DETECTING UNIT
104 PARALLAX MATCHING UNIT
105 DISTANCE ESTIMATING UNIT

106 THREE-DIMENSIONAL INFORMATION STORING UNIT
107 TWO-DIMENSIONAL INFORMATION STORING UNIT
108 MOTION MATCHING UNIT
109 Δ POSE ESTIMATING UNIT
110 LUMINANCE LEVEL DETECTING UNIT
111 INTEGRATION UNIT
121 IMAGING UNIT
122 MOTION PARALLAX-BASED DISTANCE ESTIMATING UNIT

The invention claimed is:

1. An image processing device comprising:
an exposure control unit that controls exposure by sequentially performing positive correction of increasing exposure from a proper exposure or negative correction of decreasing exposure from the proper exposure as the exposure at a time of acquiring each of a plurality of image frames in time series is in a specific execution order;
an estimating unit that estimates first position pose of the image processing device based on matching between the plurality of image frames subjected to the positive correction and second position pose of the image processing device based on matching between the plurality of image frames subjected to the negative correction; and
an integration unit that integrates the first position pose and the second position pose.

2. The image processing device according to claim 1, wherein the exposure control unit alternately performs the positive correction and the negative correction.

3. The image processing device according to claim 1, wherein the exposure control unit modifies the specific execution order based on a ratio between a number of feature points included in the plurality of image frames subjected to the positive correction and a number of feature points included in the plurality of image frames subjected to the negative correction.

4. The image processing device according to claim 3, wherein, in a case where the number of feature points included in the plurality of image frames subjected to the positive correction is larger than the number of feature points included in the image frames subjected to the negative correction, the exposure control unit modifies the specific execution order so that the plurality of image frames subjected to the positive correction are acquired more than the plurality of image frames subjected to the negative correction, and in a case where the number of feature points included in the image frames subjected to the positive correction is smaller than the number of feature points included in the image frames subjected to the negative correction, the exposure control unit modifies the specific execution order so that the plurality of image frames subjected to the negative correction are acquired more than the plurality of image frames subjected to the positive correction.

5. The image processing device according to claim 1, wherein the exposure control unit determines whether or not to control the exposure in the specific execution order, based on at least one of an area of a blown-out highlight region or a blocked-up shadow region included in an image frame captured with the proper exposure.

6. The image processing device according to claim 1, wherein the exposure control unit determines whether or not to control the exposure in the specific execution order based on a contrast ratio of an image frame captured with the proper exposure.

7. The image processing device according to claim 1, wherein the integration unit integrates the first position pose and the second position pose by a Kalman filter.

8. The image processing device according to claim 1, wherein the first position pose and the second position pose include information of three degrees of freedom indicating a change in position of the image processing device and information of three degrees of freedom indicating a change in rotation of the image processing device.

9. An image processing method, comprising:
in an image processing device:
controlling exposure by sequentially performing positive correction of increasing exposure from a proper exposure or negative correction of decreasing exposure from the proper exposure as the exposure at a time of acquiring each of a plurality of image frames in time series is in a specific execution order;
estimating first position pose of the image processing device based on matching between the plurality of image frames subjected to the positive correction and second position pose of the image processing device based on matching between the plurality of image frames subjected to the negative correction; and
integrating the first position pose and the second position pose.

* * * * *